Aug. 9, 1949.  R. A. NORBOM  2,478,777
SHIPPING CONTAINER
Filed Oct. 27, 1947  4 Sheets-Sheet 2

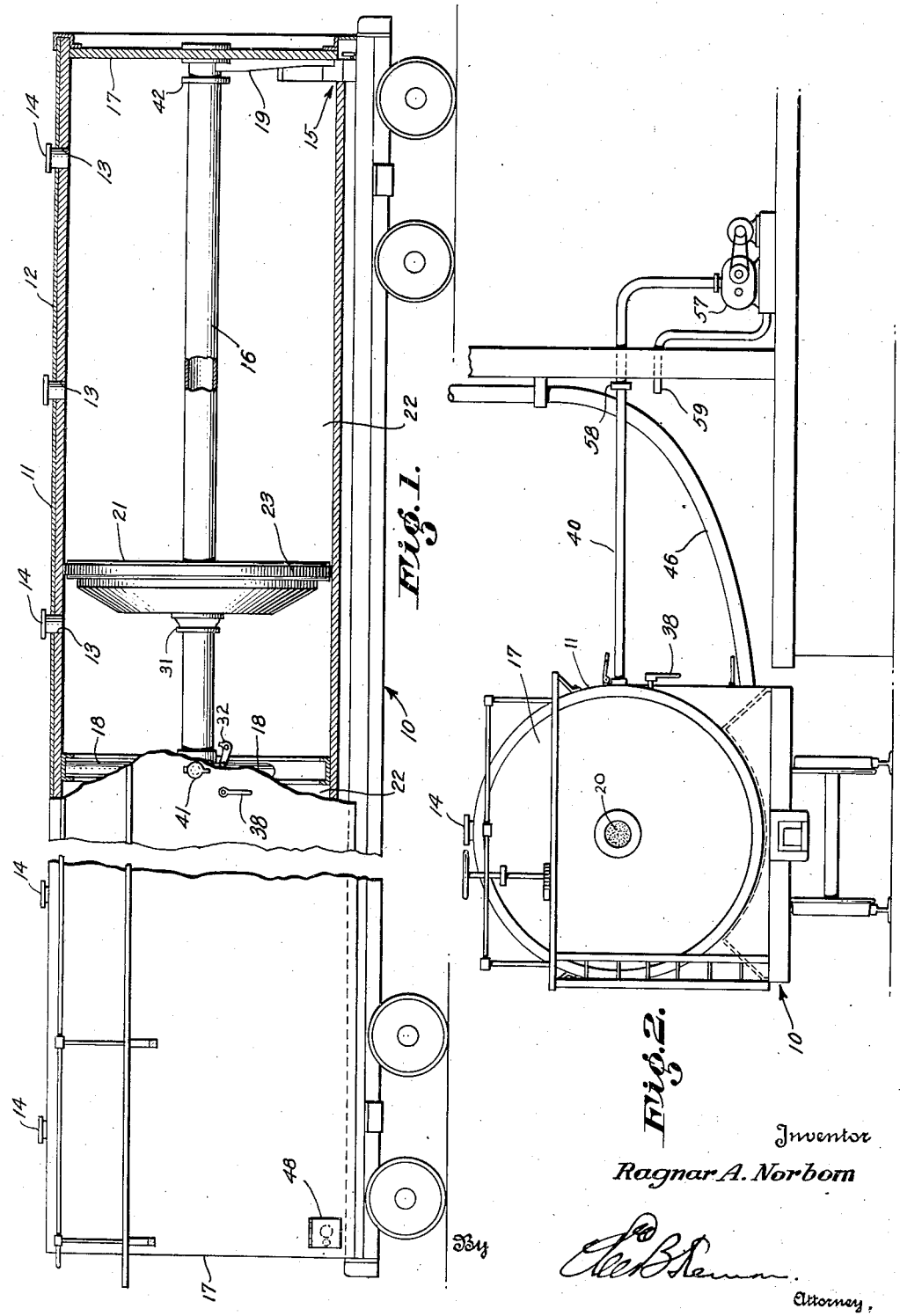

Inventor
Ragnar A. Norbom
Attorney

Aug. 9, 1949.    R. A. NORBOM    2,478,777
SHIPPING CONTAINER
Filed Oct. 27, 1947    4 Sheets-Sheet 3
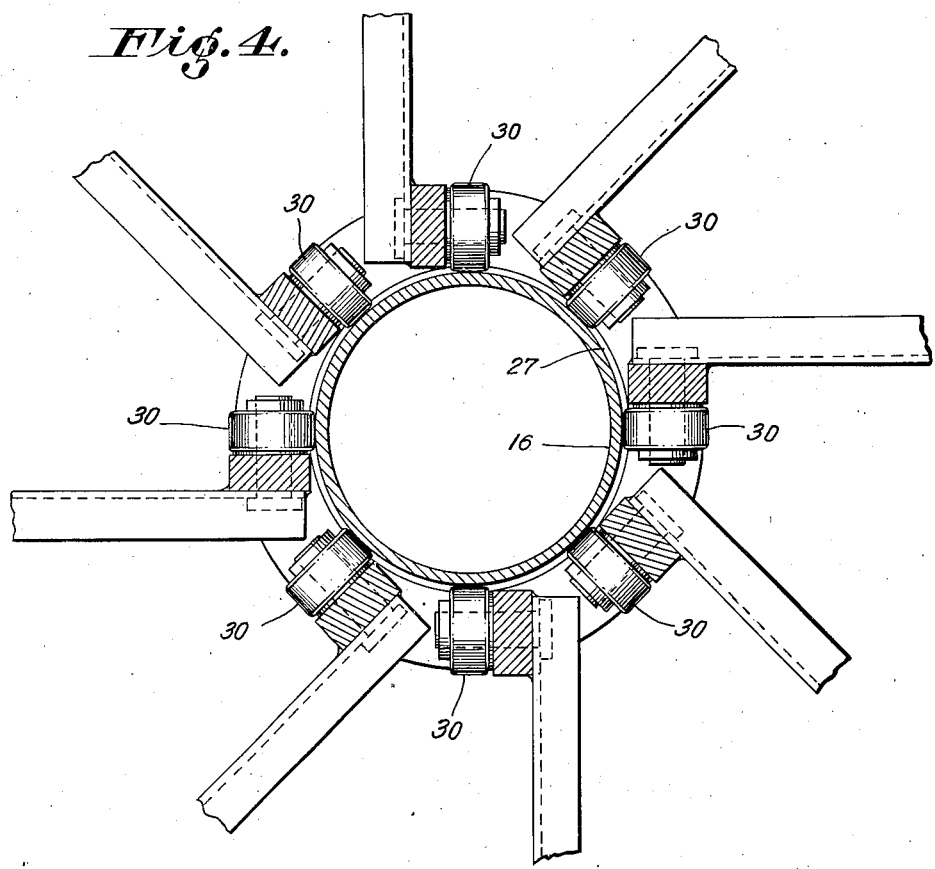
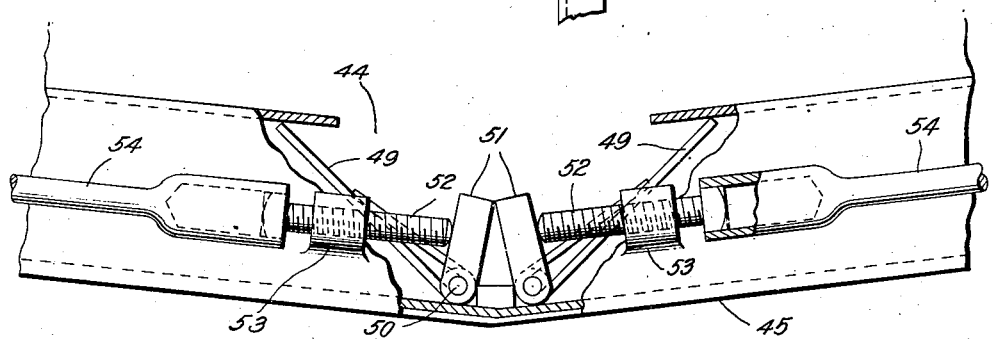
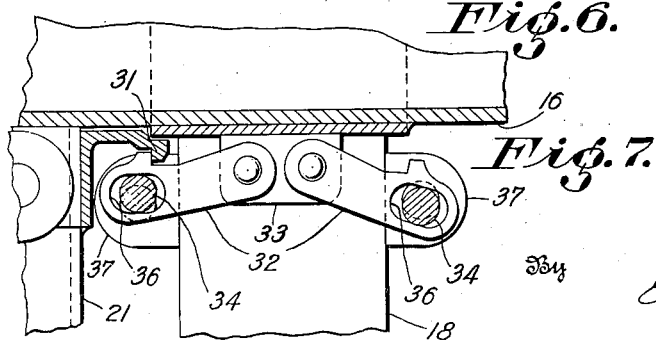
Inventor
Ragnar A. Norbom
By
Attorney.

Aug. 9, 1949.    R. A. NORBOM    2,478,777
SHIPPING CONTAINER
Filed Oct. 27, 1947    4 Sheets-Sheet 4

Inventor
Ragnar A. Norbom
By
Attorney.

Patented Aug. 9, 1949

2,478,777

UNITED STATES PATENT OFFICE 2,478,777

SHIPPING CONTAINER

Ragnar A. Norbom, New York, N. Y., assignor to National Fitch Corporation, a corporation of Delaware Application October 27, 1947, Serial No. 782,305

13 Claims. (Cl. 302—52)

This invention relates to means for the transfer or discharge of finely divided bulk material such as grain, powdered chemicals, minerals, and more especially flour or other granulated or pulverized food products that are capable of being entrained in an air stream. More particularly this invention pertains to discharge means for such material in association with a container, the latter being of the transportable type or a stationary storage bin. It is advantageous to transport and/or store finely divided food, particularly flour, in bulk form in rather large, substantially airtight containers instead of in the conventional packaged form of relatively small sacks, cartons, or barrels. Among the advantages of such large containers that may be enumerated are the elimination of packaging expense, the reduction of multiple handling charges, the elimination of losses through package breakage, and the overcoming of contamination hazards of moisture, vermin, and like nuisances. The successful employment of large containers for flour, however, depends in large measure upon the efficiency of the unloading or discharging means therefor.

Pneumatic conveyor systems are widely used at present for transferring finely divided bulk material from point to point, and have been applied to the unloading of bulk material from large containers, such as, for example, railway cars. Suction discharge of large containers, however, has met with difficulties. Finely divided bulk material, and notably flour, has some fluid characteristics, yet is subject to packing on being transported or stored for considerable time and thereby loses much of its free-flowing characteristics. Accordingly, for suction discharge of such material, means usually are provided for either moving the material to the suction discharge nozzle or opening, or moving the nozzle relative to the material. Among the means employed for practicing the former method are spiral conveyors, interior slope sheets, or tilting of the container. Manual manipulation is the prevalent method of moving the suction nozzle to the material. All of these means, however, have disadvantages. Spiral conveyors are expensive and require a source of substantial mechanical power. Slope sheets reduce the useful cubic content of a container. A tiltable container is restricted in size for practical reasons. Manual manipulation of a suction nozzle is inefficient and increases the contamination hazard.

Accordingly, it is an object of this invention to provide a large container for bulk material with simple and comparatively inexpensive pneumatic discharge means which is efficient in operation.

Another object of the invention is to provide such a container with discharge means which is operative without tilting the container and which does not require the use of interior slope sheets or a spiral conveyor.

A further object of this invention is to provide a container of the type described with improved means for pneumatically effecting the complete discharge of the contents thereof in a minimum of time.

Other objects and advantages of the invention will be evident from the following description and accompanying drawings. The invention is illustrated by the application thereof to a railway car, but it will be obvious that a stationary storage bin, a highway vehicle body, a demountable container, or storage bins, in the hold of a ship may embody the invention as well.

In the drawings:

Figure 1 is a side elevational view, partly in section, of a railway car embodying this invention.

Figure 2 is an end view of the railway car shown in Figure 1 having the pneumatic discharge system connected thereto.

Figure 4 is a sectional view taken on line 4—4 of Figure 3.

Figure 6 is an enlarged fragmentary view of a portion of Figure 5.

Figure 7 is an enlarged fragmentary view of a portion of Figure 3.

Figure 3:
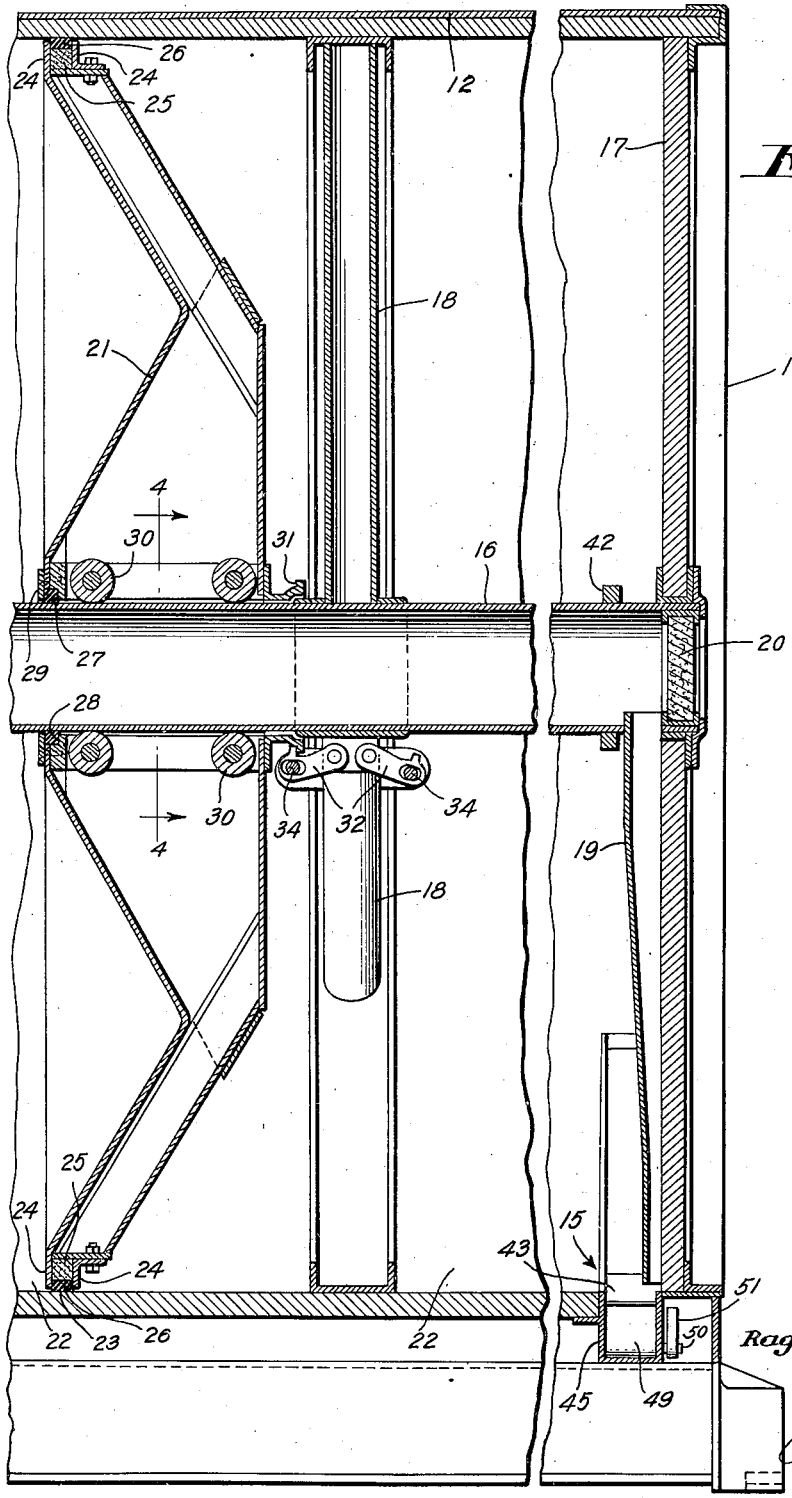
Figure 3 is an enlarged fragmentary vertical sectional view corresponding to Figure 1.
Figure 5:
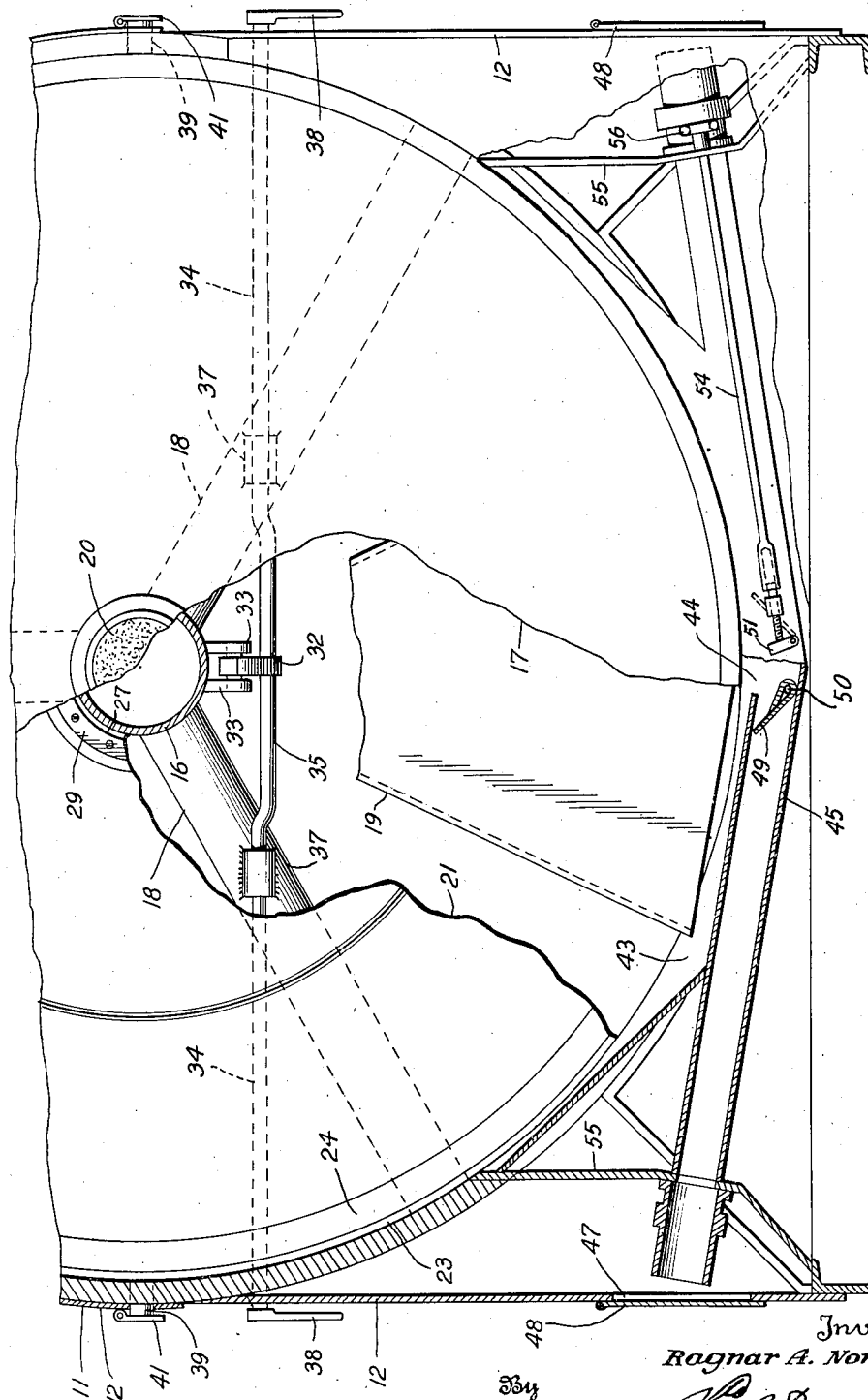
Figure 5 is an enlarged fragmentary view of one end of the car shown in Figure 1 with portions broken away to show details more clearly.

Referring now to Figures 1 and 2, there is shown a railway car with an underframe generally indicated at 10, and having a tank type container 11 mounted thereon. For transporting flour or other finely divided food products, the container preferably is constructed of wood, with a metal outer covering 12, as shown. Any other construction, however, such as a metal interior with or without insulation and covering, can be used for transporting materials which are not so subject to deterioration from temperature changes or condensation. The container is shown as cylindrical in transverse vertical section, although it will be seen that it may be oval, square, or any other substantially symmetrical shape which is of uniform configuration throughout substantially the length thereof. Filling openings 13 provided with suitable sealing closures 14 are located in the top of the container. In a lower portion of each end of the container is a suction discharge outlet, generally indicated at 15, which will be described more fully hereinafter. Extending longitudinally through the axial center of the container 11 is a tubular conduit 16, which serves as a guide rail, as later described, each end of which is secured in a corresponding end wall 17 of the container, and opens to the exterior thereof. Radial braces 18 (see Figures 1, 3 and 5) support the conduit 16 at the mid-point thereof, centrally of the container. In communication with the interior of each end of the conduit 16 and depending therefrom to a point adjacent the suction discharge outlet 15 is an entraining air inlet duct 19 which flares transversely of the container, as shown in Figure 5, and narrows longitudinally of the container, as shown in Figure 3, toward its outlet end. An air filter 20 is mounted in each end of the conduit 16 to filter the air to be delivered to the ducts 19. The outer ends of the conduit 16 may be provided with removable closures, not shown in the drawings, to prevent entrance of air, etc. to the container interior, save during a discharge operation.

Mounted for longitudinal slidable movement on the conduit 16 are two identical bulkheads 21, one on each side of the center braces 18. These bulkheads define two compartments 22 within the container, one between each bulkhead and a corresponding end wall 17. Since both halves of the container, on opposite sides of the center braces 18, are substantially identical, a description of one half of the container will suffice for both.

The bulkhead 21 is imperforate save for the central circular opening through which the conduit 16 extends, in order that the bulkhead may act as a follower, as later described. The outer and inner peripheries of the bulkhead 21 sealingly engage the side walls of the container 11 and outer walls of the conduit 16, respectively. The seal between the bulkhead and the container walls is effected by an annular composite gasket 23 replaceably mounted between outer radial flanges 24, one of which is detachable, as shown. The gasket 23 preferably comprises an inner cushion 25 of sponge or soft rubber and an outer packing 26 of hard rubber or material of similar characteristics which contacts the walls of the container. The hard rubber packing 26 resists abrasion wear, while the inner cushion 25 compensates for irregularities in the surface of the container wall and also for any axial deflection of the conduit 16. The seal between the bulkhead and the conduit 16 comprises an annular gasket 27, of rubber or other suitable material, replaceably mounted in a seat 28 at one end of the inner periphery of the bulkhead. A detachable annular retaining member 29 holds the gasket 27 in place.

The bulkhead is provided with two longitudinally spaced circumferential series of rollers 30 which bear against the conduit 16 and support the bulkhead 21 for longitudinal movement therealong. The provision of a circumferential series of rollers 30 (see Figure 4), permits the bulkhead 21 to turn or rotate on its axis, in order to prevent binding which might result from screw action during its longitudinal movement. The longitudinal spacing of the rollers 30 prevents the bulkhead 21 from tilting or canting relative to the conduit 16 because of uneven resistance to its movement caused by flour or other powdered material being packed and more dense at the bottom of the container 11 than at the top.

That side of the bulkhead 21 which faces the center braces 18 is provided with a shoulder or flange 31, with which a latch 32 may engage, as best shown in Figure 7, to lock the bulkhead in the center of the container against longitudinal movement. The latch 32 is mounted for pivotal movement on lugs 33, which depend from the conduit, and is operated by a transverse rod 34 having a central eccentric portion 35 which passes through a slot 36 in the latch. The rod 34 is rotatably mounted in lugs 37 secured to the braces 18 and sealingly extends through opposite side walls of the container 11. An exterior operating handle 38 is provided on each end of the rod 34 for turning the same to raise and lower the latch 32. As shown in Figure 7, the latch when raised is in locking position.

Opposite longitudinal movement of both bulkheads 21, either simultaneously or independently, is effected by compressed air admitted to the space therebetween through apertures, in the form of stub pipes 39, in opposite side walls of the container (see Figure 5). The outer end of each pipe 39 is adapted to have a compressed air hose 40 detachably connected thereto, as shown in Figure 2, and in the absence of such connection is sealed by a closure 41 which is springbiased to closed position. An annular member 42 is secured to the conduit 16, adjacent the end thereof, to engage and stop the travel of the bulkhead 21 before it reaches the end wall 17, for a purpose later described.

A transversely extending trough 43 depends from the container bottom, adjacent the end wall 17. The flared outlet of the air inlet duct 19 overhangs the trough 43 and extends parallel to the central portion of the bottom thereof. A suction discharge outlet 44 opens centrally through the bottom of the trough 43 into a transversely positioned suction discharge conduit 45, to either end of which a suction hose 46 may be detachably connected, as shown in Figure 2. Each end of the conduit 45 is readily accessible through an opening 47, normally closed by a pivotally mounted closure 48, in the metal side sheathing 12 of the car. On each side of the discharge outlet 44, a valve or gate 49 is mounted in the conduit 45 on a shaft 50 which extends through a lateral wall of the conduit and is provided with an operating lever 51. The valves 49 may pivot into open position by gravity action combined with the suction force applied to a corresponding end of the conduit 45. The valves are closed through the reciprocating action of screws 52 threadedly engaged through lugs 53 which are mounted on the exterior of the conduit. One end of each screw 52 bears against a corresponding lever 51 while the other end is engaged for rotative movement by the suitably shaped end of an operating rod or shaft 54. The outer end of the rod 54 is supported by and extends through a bracket 55 which latter also supports the outer end of the conduit 45. Operating handles 56 are provided for rotating the rods, and these handles are accessible through the side wall openings 47. It readily will be seen that rotation of a screw 52 in one direction, by a handle 56, forces a valve to closed position, while rotation in the opposite direction permits the valve to open under gravity aided by suction, as described above. It will be understood, however, that the simple expedient of a suitable mechanical connection between the levers 51 and the screws 52 readily may be provided so that positive opening of the valves may be effected by operation of the handles 56.

The discharge of the contents of the container may be effected at any unloading point that is equipped with known facilities including a source of compressed air and additionally a pneumatic conveyor system. The equipment necessary for unloading the car is illustrated diagrammatically in Figure 2. This includes the flexible suction hose 46 of a pneumatic conveyor system which leads to a separator for discharge into a storage bin, and a compressor 57 and flexible hose 40. The compressor should have readily accessible output and intake connections 58 and 59, respectively, for a purpose later described.

The operation of the invention, as above described, is as follows. With the bulkheads 21 locked in the center of the container by the latches 32 and the valves 49 closed, either or both compartments 22 of the container can be filled with finely divided material through the filling openings 13. When the container is filled, the sealing closures 14 are replaced. Such filling may be accomplished by any conventional means, i. e. by gravity from an overhead hopper or by a hose forming a part of a pneumatic conveyor system. The car then is transported to its final destination and spotted beside an unloading platform such as that illustrated in Figure 2. The operator then attaches the suction hose 46 to one end of the discharge conduit 45 and removes the closures for the ends of the conduit 16. One handle 56 is then operated to open the valve 49 corresponding to that end of the discharge conduit to which the suction hose is attached, and the suction of the hose turned on. Next, the compressed air hose 40 is attached between a stub pipe 39 and the output connection 58 of the compressor 57. Assuming the compressor to be in operation, it will force air into the space between the bulkheads. When only one compartment of the container is being unloaded at a time, i. e. when only one suction hose is employed, one handle 38 is turned to unlock and release the bulkhead corresponding to that compartment. The bulkhead will travel toward the corresponding end wall 17 of the container, under the influence of air pressure, and acts as a follower to push the contents of the compartment before it and into the outlet trough 43. The bulkhead moves at a rate depending mainly on the rate of suction evacuation of the material through the discharge opening 44 and conduit 45. The air inlet system for the container, via the conduit 16, is necessary to relieve vacuum within the container as the discharge progresses, and also to provide an air current adjacent opening 44 which serves to agitate and entrain the material. The wide flaring outlet of the duct 19 directs a current of air over that portion of the entire bottom of the trough 43 which is substantially horizontal, and acts to sweep the material into the discharge outlet 44. The remaining bottom surface of the trough, i. e. adjacent the ends thereof, has an inclination sufficient for gravity movement of the material therealong.

When the bulkhead reaches the limit of its permissible travel, it engages the stop member 42, which is effective to prevent the gasket 23 from over-running the depression 43 or engaging and possibly damaging the duct 19. With all the material then evacuated from the compartment, the suction is shut off, the valve 49 closed, and the suction hose 46 disconnected. The compressed air hose 40 is disconnected from the output connection 58 connected to the compressor intake 59. The compressor will then draw a vacuum between the bulkheads which returns the advanced bulkhead back to its central position where it is locked in place to prevent movement during transit or while the other compartment is being unloaded in a similar manner. Obviously, with suitable terminal facilities, both compartments of the container can be discharged simultaneously.

The compressor preferably incorporates a suitable pressure switch (not shown) which acts to limit the pump to a predetermined pressure in order to prevent the bulkhead from pressing against the lading with an excessive force. Because the bulkheads are comparatively large, the air pressure normally required to effect their movement is relatively low, a few pounds per square inch being sufficient.

It will be noted also that the container may be unloaded from either side for added convenience in use.

It will be realized that the specific structure shown and described readily is subject to changes which incorporate the primary principles of the invention. Therefore, the invention encompasses all modifications and embodiments which come within the spirit and scope of the following claims.

I claim:

1. A closed container for finely divided bulk material having uniform cross-section, a suction discharge outlet located in a lower wall portion at one end of said container, an inlet for material-entraining air overhanging said outlet in close proximity thereto, a piston-like follower mounted for longitudinally slidable movement within said container, and means to admit fluid under pressure to said container on that side of said follower remote from said outlet, whereby admission of said pressure fluid forces said follower to move toward said outlet to mechanically impel the contents of said container toward said outlet for suction discharge.

2. A closed container for finely divided bulk material having uniform cross-section, a suction discharge outlet located in a lower wall portion at one end of said container, an inlet for material-entraining air overhanging said outlet in close proximity thereto, a longitudinal guide member mounted within said container, a piston-like follower mounted on said guide member for slidable movement therealong, said follower having sealing engagement with said guide member and with the side walls of said container, and means to admit fluid under pressure to said container between the other end thereof and said follower, whereby admission of said pressure fluid forces said follower to move toward said outlet to mechanically impel the contents of said container toward said outlet for suction discharge.

3. The structure defined by claim 2, wherein the follower is mounted on the guide member by longitudinally spaced rollers.

4. The structure defined by claim 2, wherein the container and the guide member are cylindrical and the follower is mounted on said guide member by at least one series of rollers circumferentially arranged with reference to said guide member.

5. The structure defined by claim 2, including latching means for locking the follower against movement at that end of the travel thereof remote from the discharge outlet and a handle accessible exteriorly of the container for operating said latching means.

6. A closed container for finely divided bulk material, a suction discharge outlet located in a lower wall portion at one end of said container, a longitudinal conduit secured to, and opening to the exterior of at least one of, the end walls of said container, a follower mounted on said conduit for slidable movement therealong, said follower having sealing engagement with said conduit and with the side walls of said container, an air inlet duct for material-entraining air in communication with and depending from said conduit adjacent said one end of the container, said duct having an outlet adjacent said suction discharge outlet, and means to admit fluid under pressure to said container on that side of said follower remote from said suction discharge outlet.

7. A closed container for the transportation of finely divided bulk material, a piston-like follower mounted for longitudinally slidable movement therein, a transverse discharge trough depending from a lower wall portion at one end of said container, a suction discharge outlet opening through the bottom of said trough, an air inlet duct for material-entraining air in communication with the exterior of said container, said duct having a narrow flaring outlet aligned with and overhanging said trough, and means for admitting fluid under pressure to said container on that side of said follower remote from said trough, whereby admission of said pressure fluid forces said follower to move toward said trough to mechanically impel the contents of said container into said trough for suction discharge therefrom.

8. A closed container for finely divided bulk material, a piston-like follower mounted for longitudinally slidable movement therein, a suction discharge outlet located in a lower wall portion at one end of said container, an inlet for material-entraining air adjacent said outlet, a transversely disposed suction discharge conduit having communication intermediate the ends thereof with said suction discharge outlet, each end of said conduit being adapted for connection with a suction hose of a pneumatic conveyor system, and valve means in said conduit to control the discharge of material therethrough, one on each side of the point of communication of said conduit with said suction discharge outlet.

9. A closed container for the transportation of finely divided bulk material, a longitudinal conduit secured to, and opening to the exterior of at least one of, the end walls of said container, a follower mounted on said conduit for slidable movement therealong, said follower having sealing engagement with said conduit and with the side walls of said container, a transverse discharge trough depending from a lower wall portion at one end of said container, a suction discharge outlet opening through the bottom of said trough, an air inlet duct for material-entraining air in communication with and depending from said conduit adjacent said one end of the container, said duct having a narrow flaring outlet aligned with and overhanging said trough, and means to admit fluid under pressure to said container on that side of said follower remote from said trough.

10. A closed container for the transportation of finely divided bulk material having uniform cross-section, a discharge outlet located in a lower wall portion at each end of said container, a longitudinal guide member mounted within said container and extending from end wall to end wall thereof, a pair of piston-like followers mounted on said guide member for slidable movement therealong, said followers having sealing engagement with said guide member and with the side walls of said container, and means to admit fluid under pressure to said container between said followers.

11. The structure defined in claim 10 including latching means for selectively locking said followers against movement at substantially midway of the length of said container.

12. A closed container for finely divided bulk material having uniform cross-section, a discharge outlet located in a lower wall portion at each end of said container, a longitudinal conduit mounted within said container, secured to, and opening to the exterior of at least one of, the end walls thereof, an air inlet duct for material-entraining air in communication with and depending from each end of said conduit, each of said ducts having an outlet adjacent the corresponding suction discharge outlet, a pair of followers mounted on said conduit for slidable movement therealong, said followers having sealing engagement with said conduit and with the side walls of said container, and means to admit fluid under pressure to said container at substantially midway of the length thereof between said followers.

13. A closed container for finely divided bulk material, a pair of piston-like followers mounted for longitudinally slidable movement therein, a transverse discharge trough depending from a lower wall portion at each end of said container, a suction discharge outlet opening through the bottom of each trough, an air inlet duct in communication with the exterior of said container adjacent each end thereof, each of said ducts having an outlet adjacent the corresponding trough, and means to admit fluid under pressure to said container substantially midway of the length thereof between said followers, whereby admission of said pressure fluid forces said followers to move in opposite directions toward said troughs to mechanically impel the contents of said container into said troughs for suction discharge.

RAGNAR A. NORBOM.

REFERENCES CITED

The following references are of record in the file of this patent:

UNITED STATES PATENTS

| Number | Name | Date |
|---|---|---|
| 1,038,781 | Myles | Sept. 17, 1912 |
| 1,116,639 | Spencer | Nov. 10, 1914 |
| 1,362,767 | Webb | Dec. 21, 1920 |